US005986618A

United States Patent [19]
Aakula et al.

[11] Patent Number: 5,986,618
[45] Date of Patent: Nov. 16, 1999

[54] COMBINED SOLAR SHIELD AND ANTENNA GROUND PLANE STRUCTURE FOR AN ELECTRICAL ASSEMBLY

[75] Inventors: Nandakumar G. Aakula, Suffern, N.Y.; Alexander Petrunia, Madison; Walter Ulicki, Randolph, both of N.J.

[73] Assignee: Lucent Technologies Inc., Murray Hill, N.J.

[21] Appl. No.: 09/137,906

[22] Filed: Aug. 21, 1998

[51] Int. Cl.$^{6}$ .............................. H01Q 1/24; H04M 11/00

[52] U.S. Cl. .......................... 343/872; 343/702; 343/898; 455/90; 379/387

[58] Field of Search .................................... 343/872, 702, 343/898, 700 MS; 379/387; 455/90

[56] References Cited

U.S. PATENT DOCUMENTS

| | | | |
|---|---|---|---|
| 5,267,297 | 11/1993 | Kawano et al. | 379/59 |
| 5,777,583 | 7/1998 | Canora et al. | 343/700 MS |
| 5,815,120 | 9/1998 | Lawrence et al. | 343/702 |

*Primary Examiner*—Hoanganh Le
*Assistant Examiner*—James Clinger

[57] ABSTRACT

A base station for a cellular telephone system provided with a solar shield formed of conductive material. The solar shield also functions as a ground plane for an antenna mounted to its outer surface.

3 Claims, 1 Drawing Sheet

COMBINED SOLAR SHIELD AND ANTENNA GROUND PLANE STRUCTURE FOR AN ELECTRICAL ASSEMBLY

BACKGROUND OF THE INVENTION

This invention relates to an electrical assembly contained within an enclosure and which cooperates with a radiating antenna outside the enclosure and, more particularly, to structure which functions as a combined solar shield and antenna ground plane for such an assembly.

An electrical assembly utilized as a base station for a cellular telephone system is typically mounted outdoors, where it is exposed to the environment. Such an assembly includes heat generating components and is mounted within an enclosure, and therefore some means for dissipating the heat must be provided. In addition, such an assembly is usually provided with an outer cover which acts as a solar shield and which is beneficial in sheltering the assembly from solar heat. It is also known to provide a heat sink including heat conducting fins on the enclosure under the solar shield for dissipating heat generated within the enclosure. The outer cover also acts as a wind shield to protect the fins from excessive wind which could overcool the internal electronic components of the base station. The electrical assembly also cooperates with a radiating antenna outside the enclosure. The antenna is usually mounted under the cover which must therefore be non-conductive to allow electromagnetic waves to pass therethrough. However, with such an arrangement, the heat sink fins distort the radiation pattern of the antenna. Therefore, in the past, a ground plane has been provided between the antenna and the heat sink. This antenna ground plane adds an additional component and its associated cost, and interferes with the flow of air ventilating the heat fins. It would therefore be desirable to provide structure which does not suffer from the afore-described disadvantages.

SUMMARY OF THE INVENTION

In accordance with the principles of this invention, there is provided a combined enclosure cover and antenna ground plane structure for use with an electrical assembly of the type described. The inventive structure includes a conductive plate on a first side of which is mounted the antenna so that the conductive plate functions as a ground plane for the antenna. The conductive plate is formed to function as a cover (solar shield) for the enclosure containing the electrical assembly, with the conductive plate first side facing away from the enclosure. A non-conductive radome is secured to the first side of the conductive plate to cover the antenna.

In accordance with an aspect of this invention, the conductive plate is perforated to allow air flow for cooling the electrical assembly.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
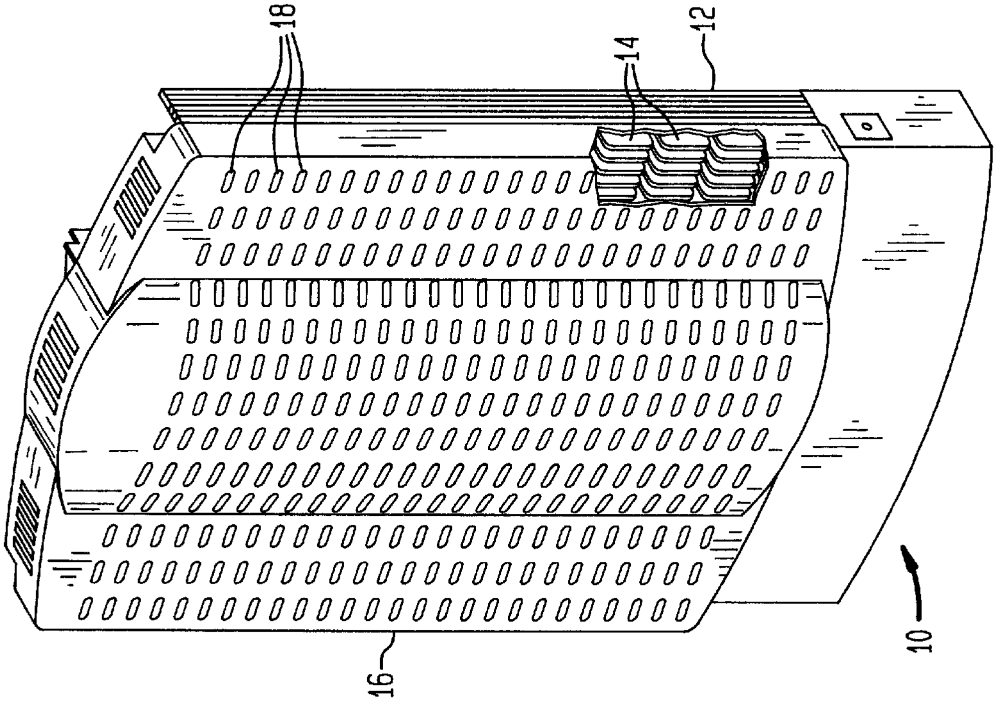
FIG. 1 (PRIOR ART)
FIG. 1 is a perspective view, partially broken away, showing a prior art cellular telephone base station enclosure covered by a solar shield.

Referring now to the drawings, FIG. 1 shows a cellular telephone system base station according to the prior art and designated generally by the reference numeral 10. The base station includes an enclosure 12 containing heat generating electrical components. On an exterior wall of the enclosure 12 is an array of heat conducting parallel planar fins 14. The fins 14 are aligned parallel to a vertical axis when the station 10 is mounted as intended. Thus, between adjacent pairs of the fins 14 a plurality of vertical channels are defined. The distal edge of each of the fins 14 remote from the exterior wall of the enclosure 12 to which they are mounted is preferably a substantially straight line, and all such edges (lines) lie in a single plane. However, each of the fins is formed with a plurality of notches in its distal edge. These notches are aligned with the notches of all the other fins to define a plurality of horizontal channels.

To protect the base station 10, it is encased within a cover, or solar shield, 16. The cover 16 may be secured to the enclosure 12 in any desired manner, such as by screws, by being snap fit, etc. The cover 16 is over and spaced from the fins 14 and has an array of relatively small perforations 18 therethrough. Preferably, the perforations 18 are substantially elliptical in shape each with a horizontal major axis and are arrayed along a plurality of horizontal lines. The horizontal lines are so located that each of the horizontal channels of the fins 14 has at least one of the horizontal lines of the perforations 18 overlying it. In addition, between those horizontal lines overlying the horizontal channels, there are additional horizontal lines of perforations.

Figure 2:
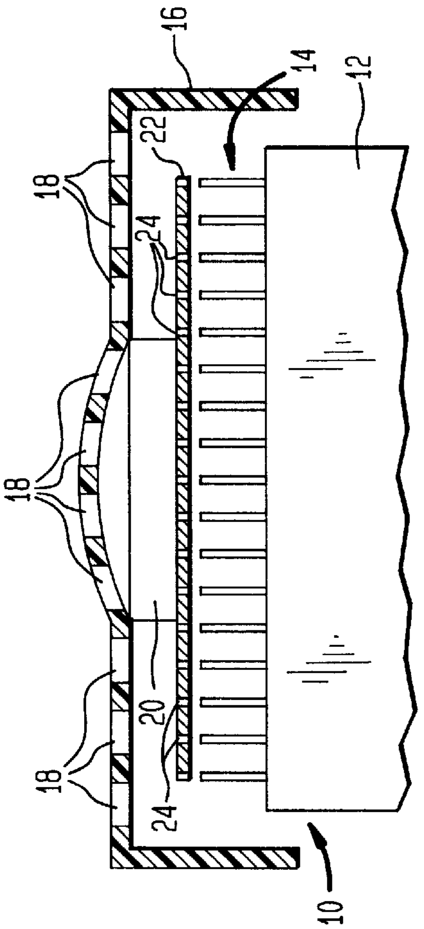
FIG. 2 (PRIOR ART)
FIG. 2 is a schematic horizontal partial sectional view of the base station shown in FIG. 1.

As shown in FIG. 2, a radiating antenna 20 is mounted behind the solar shield 16. The antenna 20 is connected to electrical components (not shown) within the enclosure 12. It has been found that the proximity of the antenna 20 to the conductive heat fins 14 distorts the radiation pattern of the antenna 20. Accordingly, a planar conductive plate 22 is mounted to the antenna 20 between the antenna 20 and the fins 14 to act as a ground plane for the antenna 20. The plate 22 is formed with perforations 24 so that the air flow through the perforations 18 of the solar shield 16 is not entirely blocked from ventilating the fins 14. As previously discussed, the separate ground plane 22 adds an additional component and its associated cost to the base station 10 and, although it is formed with the perforations 24, it still interferes with air flow.

Figure 3:
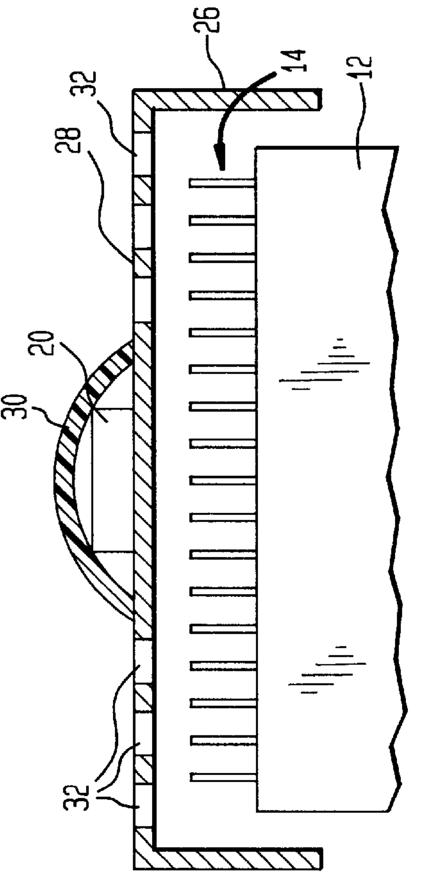
FIG. 3 is a view similar to FIG. 2 showing the inventive combined solar shield and antenna ground plane structure.

FIG. 3 illustrates the inventive concept of a combined solar shield and antenna ground plane structure for the base station 10. As shown, this combined structure includes a conductive plate 26, on a first side 28 of which is mounted the antenna 20 so that the plate 26 functions as a ground plane for the antenna 20. The plate 26 is also formed to function as a cover, or solar shield, for the enclosure 12 with the first side 28 facing away from the enclosure 12. A non-conductive radome 30 is secured to the first side 28 of the plate 26 in an appropriate manner to cover the antenna 20. So that air may flow to ventilate the fins 14, the plate 26 is formed with perforations 32 in a pattern similar to the pattern of the perforations 18 (FIG. 1).

Thus, in accordance with the principles of this invention, the plate 26 functions as a cover for the enclosure 12 and as a ground plane for the antenna 20, so that the radiation pattern of the antenna 20 is not distorted by the fins 14 or any other metal protrusions. The antenna 20 is protected from the elements by the radome 30. Since the radome 30 is formed of non-conductive (i.e., insulative) material, preferably a molded plastic or the like, electromagnetic waves pass therethrough without distortion or attenuation. The conductive plate 26, preferably a painted metal plate, is stronger and more durable than the plastic solar shield 16 (FIG. 1) and therefore is longer lasting. Another advantage of the inventive construction is that since the plate 26 is both the solar shield and the antenna ground plane, it can be closer to the fins 14 than can be the cover 16, thereby reducing the overall size of the base station 10, while also allowing a freer flow of air to the fins 14 from the front side of the perforated metal shield 26.

Accordingly, there has been disclosed improved solar shield and antenna ground plane structure for an electrical assembly. While an exemplary embodiment of the present invention has been disclosed herein, it is understood that various modifications and adaptations to the disclosed embodiment will be apparent to one of ordinary skill in the art and it is intended that this invention be limited only by the scope of the appended claims.

What is claimed is:

1. In combination with an electrical assembly for a base station contained within an enclosure and cooperating with an antenna outside said enclosure, a combined enclosure cover and antenna ground plane structure comprising:

a conductive plate on a first side of which is mounted the antenna so that the conductive plate functions as a ground plane for the antenna, the conductive plate being separate from the enclosure and further formed to function as a cover for said enclosure with the conductive plate first side facing away from said enclosures, and wherein said conductive plate is perforated to allow air flow for cooling the electrical assembly; and a non-conductive radome secured to said conductive plate first side and covering said antenna.

2. The structure according to claim 1 wherein:

the enclosure includes an array of heat conducting parallel planar fins secured to an exterior wall of the enclosure, the fins being aligned parallel to a vertical axis when the enclosure is mounted to define a plurality of vertical channels between adjacent pairs of fins, the fins being formed with a plurality of aligned notches to define a plurality of horizontal channels; and the conductive plate is spaced from said fins, and the perforations of said conductive plate are arrayed along a plurality of horizontal lines, with at least one of said plurality of horizontal lines overlying a respective one of said horizontal channels.

3. The structure according to claim 2 wherein:

the edge of each fin remote from said exterior wall is a substantially straight line and all such edges lie in a single plane; and the conductive plate is generally parallel to said single plane.

* * * * *